Figure 1:
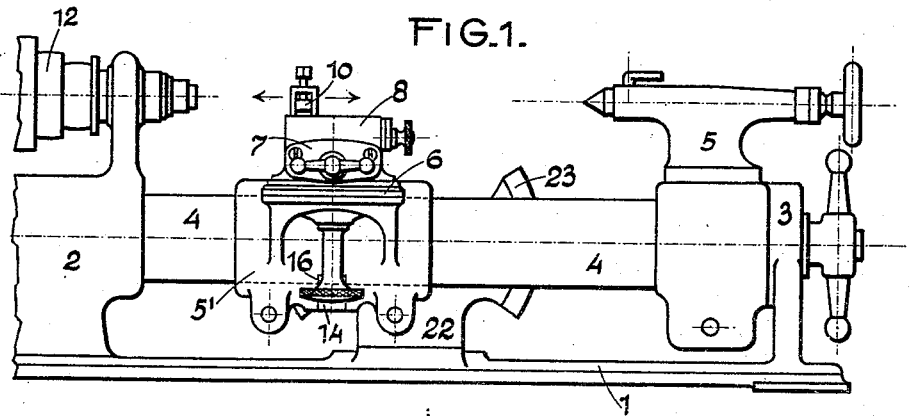

C. SANDOZ-MORITZ.
MACHINE TOOL.
APPLICATION FILED DEC. 12, 1917.

1,279,741.

Patented Sept. 24, 1918.
2 SHEETS—SHEET 1.

INVENTOR:
Charles Sandoz-Moritz
ATTY.

C. SANDOZ-MORITZ.
MACHINE TOOL.
APPLICATION FILED DEC. 12, 1917.

1,279,741.

Patented Sept. 24, 1918.

2 SHEETS—SHEET 2.

INVENTOR:
Charles Sandoz-Moritz
ATT'Y

UNITED STATES PATENT OFFICE.

CHARLES SANDOZ-MORITZ, OF TAVANNES, SWITZERLAND.

MACHINE-TOOL.

1,279,741.  Specification of Letters Patent.  Patented Sept. 24, 1918.

Application filed December 12, 1917. Serial No. 206,770.

*To all whom it may concern:*

Be it known that I, CHARLES SANDOZ-MORITZ, a citizen of the Swiss Republic, residing at Tavannes, Switzerland, have invented new and useful Improvements in Machine-Tools, of which the following is a specification.

The subject of the present invention is a machine tool such as for example an engine lathe comprising a tool moved automatically by means comprising a screw on which travels a nut operatively connected to the toolholder. The feature of the machine resides in this that the said means comprise a member which participates in the translatory movement of the nut and which in addition is capable of a movement of rotation about the axis of the screw; this member being guided by a movable guide capable of being adjusted and fixed in a position such that the member is given a rotary movement combined with its movement of translation whereby the point of the tool is displaced obliquely, approximately on the generatrix of a cone the axis of which coincides with the axis of rotation of the work.

Figure 2:
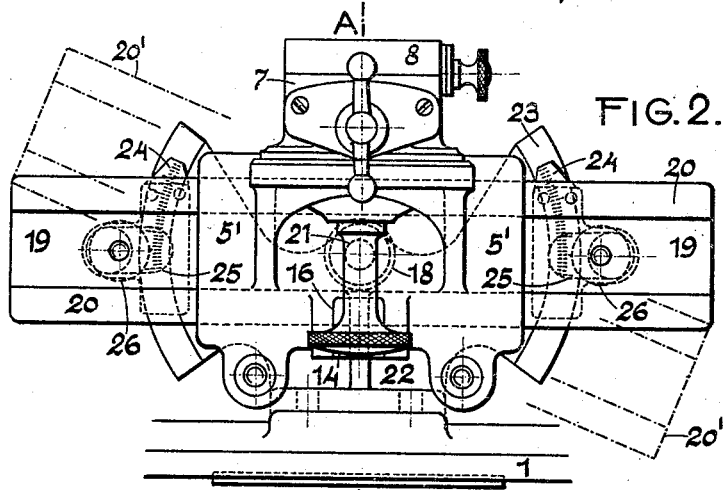
Figure 3:
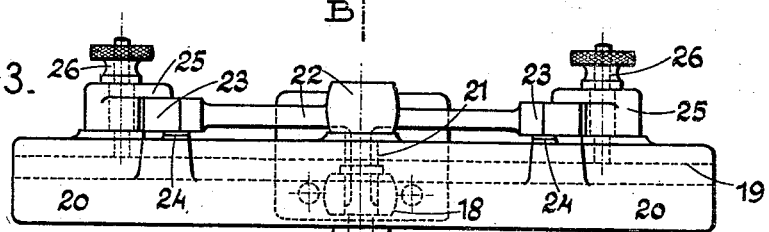
Figure 4:
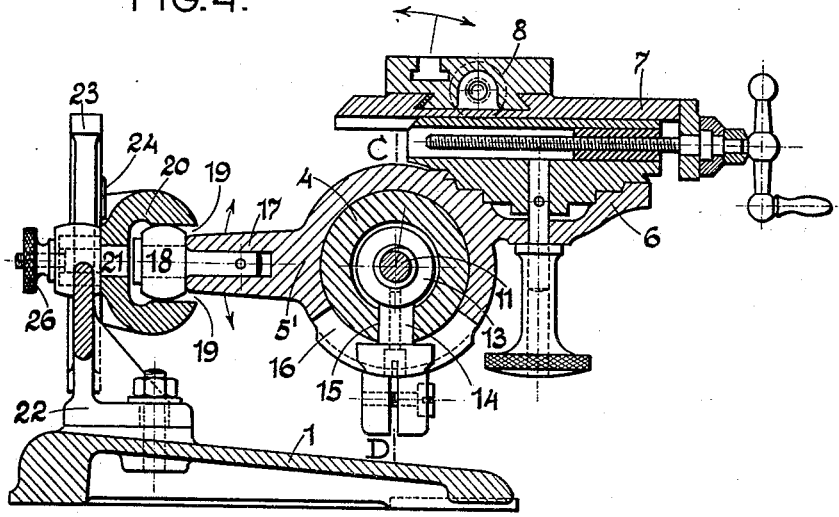
Figure 5:
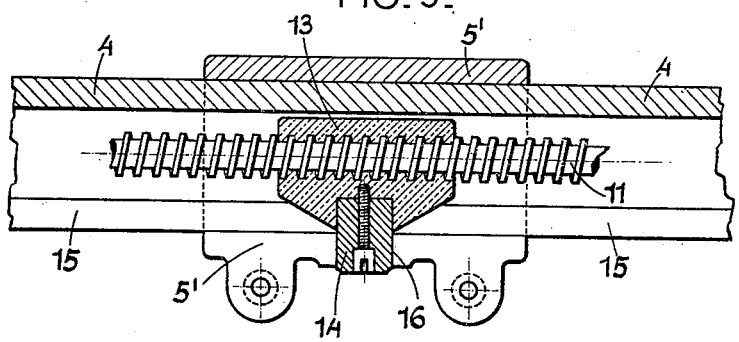

The drawing shows by way of example one embodiment of the subject of the invention:

Figure 1 is a front elevation; Fig. 2 shows to enlarged scale a detail of Fig. 1; Fig. 3 is a plan of Fig. 2, while Fig. 4 is a section on the line A—B of Fig. 2; Fig. 5 is a section on the line C—D of Fig. 4.

The drawing shows an engine lathe of which 1 denotes the framework comprising the fixed head-stock and tail-stock supports 2 and 3 connected by a horizontal tubular arm 4. On the latter are mounted the movable tail-stock 5 and the tool holder carriage which comprises a sleeve 5' provided with a platform 6 on which is mounted through the medium of two adjusting slides 7 and 8 the tool 10. Through the arm 4 passes the screw threaded spindle 11 driven in known manner by a pulley 12 through the medium of a train of gearing (not shown). On the screw threaded spindle 11 moves the nut 13 (Figs. 4 and 5) formed with an extension 14 engaging in the longitudinal slot 15 of the arm 4 in such manner as to prevent the nut 13 from rotating on the screw threaded spindle 11. The extension 14 passes through the arm 4 and terminates in a head located in an opening 16 in the sleeve 5'. This opening is concentric with the pivot of the sleeve. As a result the latter moves with the translatory movement of the nut 13 but is capable of a certain angular movement on the arm 4. The sleeve 5' has an arm 17 on the end of which is mounted a roller 18 engaged in the slide way 19 of an adjustable guide or templet 20. This guide is mounted by means of a pivot 21 on a support 22 fixed to the frame 1 in such manner that it may be adjusted into an inclined position such as the position 20' indicated in Fig. 2. The support 22 has two sectors 23 concentric with the pivot of the guide 20 and disposed symmetrically in relation to the line A—B (Fig. 2). On each sector is marked a graduation in relation to which is placed a pointer 24 fixed to the guide 20. In lieu of two graduations there may only be one. Thus there can be given to the guide an inclined position corresponding to a certain angle by assuming that the horizontal position of the guide coincides with the indication zero on the graduation of the sectors 23. The guide 20 may be locked in the position occupied; for this purpose there is provided adjacent each sector 23 a dog 25 which bears on the rear face of the sector and comprises a locking nut 26. By screwing up the nut 26 the guide 20 is locked firmly against the sectors 23 and is consequently rigid.

When it is desired to turn material cylindrically on the lathe described the guide 20 is brought into the horizontal position indicated in full lines in Fig. 2. The lathe is then set in operation, the nut 13 is displaced on the screw 11 carrying with it through the medium of the extension 14 the sleeve 5'. The latter being guided by the slide 19 of the guide 20 occupying a position exactly parallel to the arm 4, carries in its turn, through the medium of the members 6, 7 and 8, the tool 10 which is moved parallel to the axis of the work to be turned, as indicated by arrows in Fig. 1. On the other hand, to turn material conically on the lathe the guide 20 is first brought into the inclined position corresponding to the conicity the piece to be turned should possess when finished. As a result the sleeve 5' and the elements in one therewith effect in addition to a movement of translation parallel to the arm 4 a rotary movement concentric with the arm, a movement of which the amplitude is proportional to the angle of inclination of the guide 20. As a result the tool of the lathe is displaced obliquely approximately following the generatrix of a cone the axis of which coincides with the axis of the piece of work.

The tool may be applied to machine tools other than engine lathes.

Having now particularly described and ascertained the nature of my said invention and in what manner the same is to be performed, I declare that what I claim is:—

A machine tool comprising, in combination with the head-stock, a screw arranged to turn about an axis substantially parallel to the axis of the stock, a nut adapted to travel on the screw, a sleeve surrounding the nut and the screw and extending longitudinally of the screw, the sleeve being fixed and having a longitudinal slot, a templet adjustable in a plane parallel to the axis of the screw, a member supported loosely on the sleeve and fixedly connected to the nut, said member and the nut being so shaped and arranged that the member is movable on the sleeve to swing about a fulcrum coincident with the axis of the screw and simultaneously to turn the nut on the screw, a tool holder carried by said member to one side of the axis of the screw, and an arm carried by the member and having its free end operatively connected to the templet, so that the templet, according to its preliminary adjustment, controls the angular position of said member on its fulcrum in various positions of the nut on the screw, whereby as the screw is operated to move the nut and said member longitudinally of the screw, said member is also rotated about the screw to move the point of a tool carried by the tool holder obliquely approximately along the generatrix of a cone the axis of which coincides with the axis of rotation of the screw.

In testimony whereof I have signed my name to this specification in the presence of two subscribing witnesses.

CHARLES SANDOZ-MORITZ.

Witnesses:
 H. J. STEHLIN,
 CLIDE BLINCH.

Copies of this patent may be obtained for five cents each, by addressing the "Commissioner of Patents, Washington, D. C."